United States Patent
Corriveau et al.

[11] Patent Number: 5,991,633
[45] Date of Patent: Nov. 23, 1999

[54] METHOD OF DYNAMICALLY CONTROLLING THE LENGTH OF A R_DATA MESSAGES ON A RANDOM ACCESS CHANNEL

[75] Inventors: Michel Corriveau, St. Hubert; Eric Turcotte, Verdun, both of Canada

[73] Assignee: Telefonaktiebolaget LM Ericsson, Stockholm, Sweden

[21] Appl. No.: 08/838,432

[22] Filed: Apr. 7, 1997

Related U.S. Application Data

[60] Provisional application No. 60/037,331, Feb. 7, 1997.

[51] Int. Cl.[6] .................................................. H04Q 7/20
[52] U.S. Cl. ........................................ 455/466; 455/515
[58] Field of Search .................................. 455/466, 509, 455/515, 516, 517, 453; 370/465, 468, 470, 471, 472, 230, 232, 234, 241, 349

[56] References Cited

U.S. PATENT DOCUMENTS

| | | | |
|---|---|---|---|
| 5,311,516 | 5/1994 | Kuznicki et al. | 370/349 |
| 5,537,414 | 7/1996 | Takiyasu et al. | 455/509 |
| 5,548,789 | 8/1996 | Nakanura | 455/31.2 |
| 5,606,552 | 2/1997 | Baldwin et al. | 370/472 |
| 5,655,215 | 8/1997 | Diachina et al. | 455/466 |
| 5,673,259 | 9/1997 | Quick | 370/342 |
| 5,703,880 | 12/1997 | Miura | 370/465 |
| 5,729,531 | 3/1998 | Raith et al. | 370/330 |
| 5,729,540 | 3/1998 | Wegrzyn | 370/336 |
| 5,745,860 | 4/1998 | Kallin | 455/574 |
| 5,806,007 | 9/1998 | Raith et al. | 455/574 |
| 5,822,310 | 10/1998 | Chennakeshu et al. | 455/10 |
| 5,822,700 | 10/1998 | Hult et al. | 455/466 |

FOREIGN PATENT DOCUMENTS

| | | |
|---|---|---|
| WO 93/10600 | 5/1993 | WIPO . |
| WO 94/13070 | 6/1994 | WIPO . |
| WO 95/07578 | 3/1995 | WIPO . |
| WO 96/32794 | 10/1996 | WIPO . |
| WO 97/39593 | 10/1997 | WIPO . |

OTHER PUBLICATIONS

PCT International Search Report, Nov. 4, 1998, PCT/SE 98/00068.

*Primary Examiner*—Dwayne D. Bost
*Assistant Examiner*—Jean A. Gelin
*Attorney, Agent, or Firm*—Jenkens & Gilchrist, P.C.

[57] ABSTRACT

A method for dynamically controlling the length of an R_DATA message on a random access channel is disclosed. Initially, a set of threshold values for traffic load levels are established with respect to the usage of a random access (RACH) channel. A particular R_DATA message length is then associated with each of these threshold values. The RACH channel is monitored to track the traffic load on the RACH, and once one of the established threshold levels are reached, the R_DATA message length is set to the value associated with that threshold level. R_DATA messages are then transmitted according to the new length.

14 Claims, 4 Drawing Sheets

FIG. 2

| Value | Function |
|---|---|
| 000 | No R - DATA message on RACH |
| 001 | 31 octet R - DATA message on RACH allowed |
| 010 | 63 octet R - DATA message on RACH allowed |
| 011 | 127 octet R - DATA message on RACH allowed |
| 100 | 201 octet R - DATA message on RACH allowed |
| 101 | Reserved |
| 110 | Reserved |
| 111 | Limited only by layer 2 format |

METHOD OF DYNAMICALLY CONTROLLING THE LENGTH OF A R_ DATA MESSAGES ON A RANDOM ACCESS CHANNEL

CROSS-REFERENCE TO RELATED APPLICATION

This Application claims the benefit of prior filed and now abandoned U.S. Provisional Application Ser. No. 60/037,331, entitled "DYNAMICALLY CONTROLLING THE R_DATA LENGTH PARAMETER WITHIN A MOBILE TELECOMMUNICATIONS NETWORK", filed Feb. 7, 1997 (Inventors: Michel Corriveau and Eric Turcotte).

BACKGROUND OF THE INVENTION

1. Technical Field of the Invention

The present invention relates to mobile originating short message services, and more particularly, to transmission of the R_DATA message on an air interface.

2. Description of Related Art

The IS-136 standard defines the air interface between a mobile station and a base station. The IS-136 standard supports mobile originating short message services (MO SMS), enabling a mobile station to originate and transmit SMS messages. Within the IS-136 protocol, the R_DATA LENGTH parameter defines the maximum length of the R_DATA uplink message. The IS-136 standard provides no guidelines for determining how the R_DATA LENGTH parameter should be set. Nor does the IS-136 standard provide any access priority scheme between SMS messages or voice/data/fax calls. Thus, once a random access channel (RACH) sub-channel is seized for any kind of access, the channel is no longer available for an additional access. Once all sub-channels are seized, other mobile stations requiring access to the RACH will be unsuccessful.

This presents a problem to mobile system operators who desire voice/data/fax accesses to comprise a larger share of the channel traffic than SMS message traffic, since these types of accesses provide more revenue due to their increased access length times. Thus, setting the R_DATA LENGTH parameter in a static manner can lead to a loss of revenue during low traffic load times due to system capacity being under used by MO SMS users. Similarly, during high traffic load periods, revenues are lost from voice/data/fax accesses due to RACH congestion with MO SMS users.

SUMMARY OF THE INVENTION

The present invention overcomes the foregoing and other problems with a method for dynamically controlling the length of an R_DATA message transmitted on a random access channel (RACH). Initially, a number of threshold values are determined for the random access channel and associated with a particular length of R_DATA message. The threshold level will be different based upon whether or not the traffic load is increasing or decreasing to prevent unnecessary fluctuations in the R_DATA message length. Also, a number of R_DATA LENGTHS may be used at various increasing or decreasing traffic load levels such that message lengths are periodically decreased as the RACH channel becomes busier or increased as the RACH channel traffic load decreases.

Once these threshold values are established and associated with a particular R_DATA message length, the load levels on the RACH are continuously or periodically monitored to determine the current traffic load on a RACH channel. Once one of the established threshold values for traffic load are reached, the R_DATA LENGTH parameter is altered, such that the R_DATA message is set to a length indicated with the associated load level. R_DATA messages are then transmitted according to the established R_DATA LENGTH.

BRIEF DESCRIPTION OF THE DRAWINGS

For a more complete understanding of the present invention, reference is made to the following detailed description taken in conjunction with the accompanying drawings wherein:

FIG. 2 is a table illustrating the potential values and associated functionalities of the R_DATA message length parameter;

DETAILED DESCRIPTION OF THE INVENTION

Figure 1:
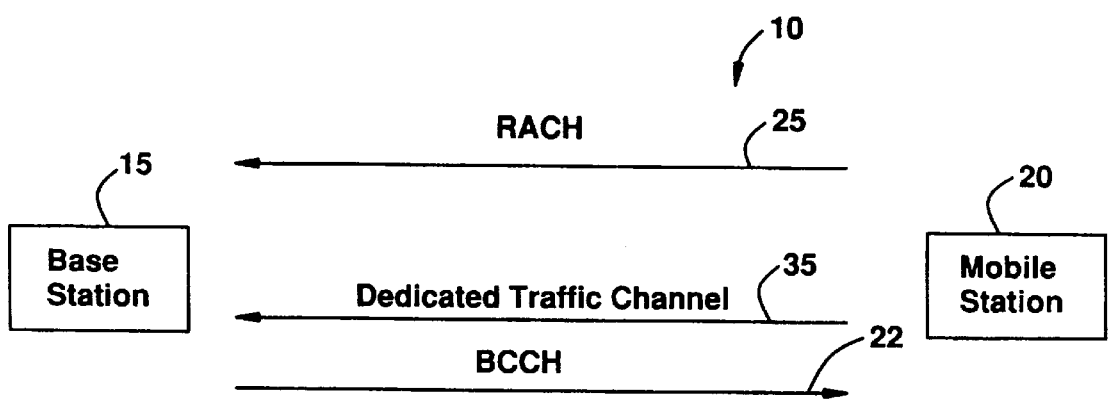
FIG. 1 is an illustration of various channels included within the air interface between a base station and a mobile station in both the uplink and downlink directions.

Referring now to the drawings, and more particularly to FIG. 1, there is illustrated various channels of the air interface 10 between a base station 15 and mobile station 20. R_DATA messages for mobile originating short message services (MO SMS) are transmitted from the mobile station 20 to the base station 15 over the random access channel (RACH) 25. The random access channel 25 is also utilized to request signaling channels for voice, data and fax transmissions.

In the IS-136 standard, the RACH 25 contains six sub-channels for transmitting these types of requests and for transmitting R-DATA messages. Once all sub-channels have been seized, additional voice, data and fax signaling channel requests may not be made until a channel is freed. Once the requests are granted, dedicated traffic channels 35 are assigned and used to transmit voice/fax/data from the mobile station 20 to the base station 15.

The length of the R_DATA message transmitted from the mobile station 20 to the base station 15 on the RACH 25 is established by the R_DATA LENGTH parameter. The R_DATA LENGTH parameter identifies the maximum length of an R-DATA message that a mobile station may transmit on the RACH 25. As shown in FIG. 2, the R_DATA length parameter consists of a value indicating a particular number of octets that the R_DATA message may comprise or whether an R_DATA message may even be transmitted. It should be realized, that the particular message lengths and values illustrated in FIG. 2 are only for purposes of discussion and various other message lengths or values could be utilized to define the R_DATA message length using the IS-136 or other type of air interface communications protocol.

The R_DATA LENGTH parameter is transmitted to the mobile station 20 from the base station within the access parameter message. The access parameter message is transmitted within the downlink on the broadcast control channel (BCCH) 22 from the base station 15 to mobile station 20.

Figure 3A:
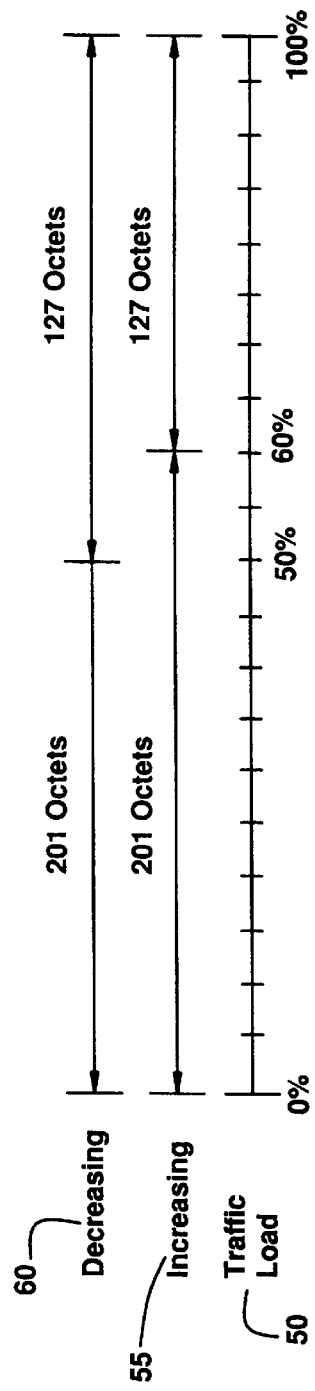
FIGS. 3a and 3b illustrates various threshold traffic load levels and associated R_DATA message lengths.
Figure 3B:
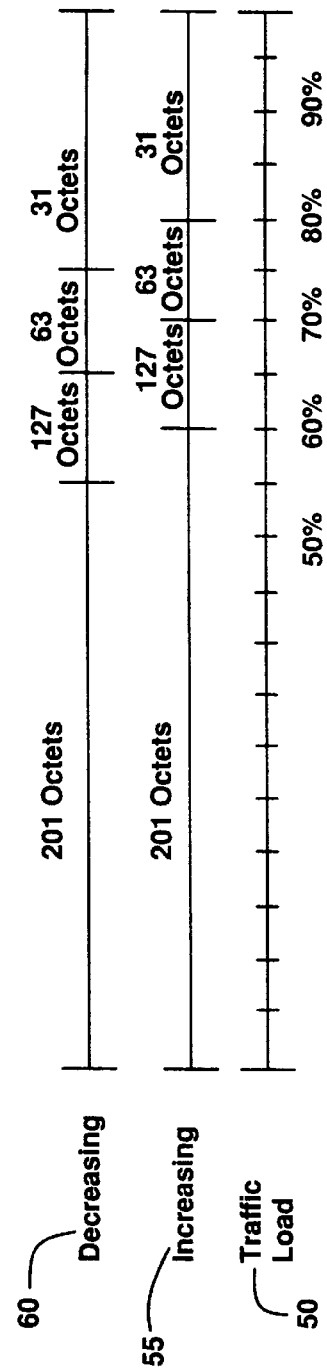

Referring now to FIGS. 3a and 3b, there are illustrated the various manners in which a particular value for the R_DATA LENGTH parameter is associated with predetermined traffic load levels on the RACH 25. These traffic load levels and values are established to enable dynamic control of the length of R_DATA messages. FIG. 3a illustrates a scale 50 describing the traffic load level of the RACH 25 as a percentage from 0% to 100% with 0% illustrating no usage of the RACH and 100% illustrating complete usage of the RACH. As traffic load levels 55 are increasing, the R_DATA message length is established at 201 octets from 0% utilization to 60% utilization of the RACH. Once utilization of the RACH reaches 60%, the parameter value for RACH message length is changed to 127 octets, thus decreasing the message size. For decreasing load levels 60, the R_DATA message length is set to be 201 octets from 0% to 50% and 127 octets from 50% to 100%.

It is noted that from the 50% to 60% RACH utilization range, the size of R_DATA message may be different depending upon whether traffic load levels are increasing or decreasing. This is to prevent rapid switching between message length values near threshold levels. Thus, it is important that the hysteresis between data increasing and decreasing threshold values be wide enough to prevent repeated switching. This prevents the mobile phone from repeatedly exiting its sleep mode in order to read and store a new R_DATA LENGTH value transmitted to the mobile station 20 through the broadcast control channel 22. Indications of a new R_DATA LENGTH value are provided by the broadcast control channel change indicator. Overly frequent changes may decrease the battery life. Thus, limiting the changes by separating increasing and decreasing threshold traffic levels limit this problem.

Referring now also to FIG. 3b, a variety of threshold traffic load levels are established for increasing and decreasing traffic loads respectively. For increasing traffic loads 55, R_DATA message length is 201 octets from 0% to 60%, 127 octets from 60% to 70%, 63 octets from 70% to 80%, and 31 octets from 80% to 100%. Likewise, for decreasing traffic loads 60, the R_DATA message length is 31 octets from 100% to 75%, 63 octets from 75% to 65%, 127 octets from 65% to 55%, and 201 octets from 55% to 0%. Again, the increasing and decreasing threshold levels are separated to prevent unnecessary switching between parameter values. It should be realized that the various threshold traffic load levels and octet lengths discussed with respect to FIGS. 3a and 3b are merely examples and various other thresholds and octet lengths may be utilized while remaining within the spirit of the present invention.

During initial system start, the R_DATA message length will correspond to the increasing threshold value level below or equal to the current RACH traffic load. If the current RACH traffic load is below the lowest increasing threshold value defined, the R_DATA LENGTH parameter will correspond to the lowest defined value for R_DATA LENGTH.

Figure 4:
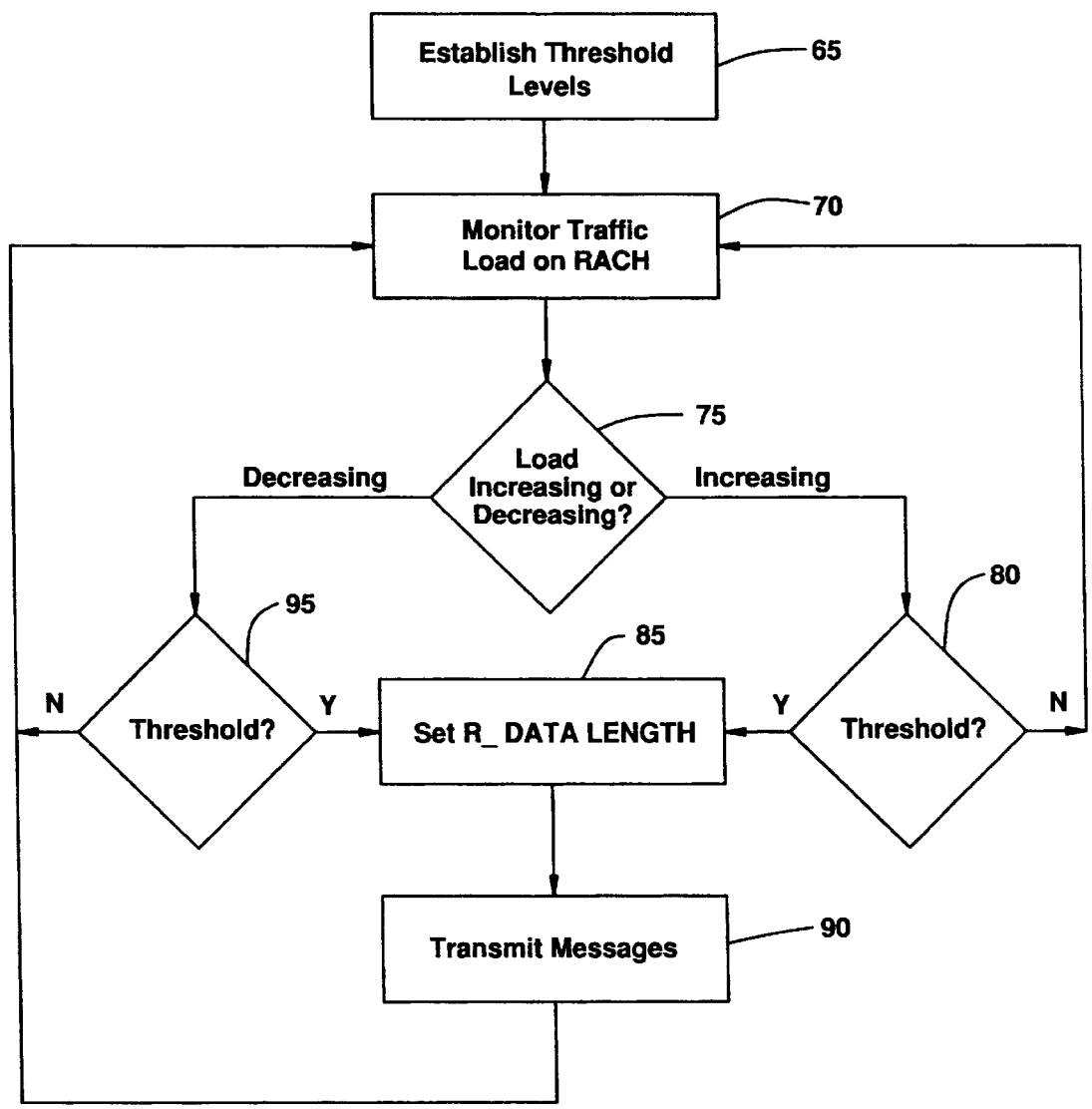
FIG. 4 is a flow diagram illustrating the method of the present invention.

Referring now to FIG. 4, there is illustrated the method for dynamically controlling the length of the R_DATA message on the random access channel 25. After establishing the various threshold levels and associated parameter values at step 65, the traffic load occurring over the RACH 25 is monitored at step 70 to keep track of the load over the RACH channel. Calculation of the exact RACH traffic load may be done in a variety of ways. The traffic load on the RACH 25 can be calculated as the percent of busy RACH sub-channels. This measurement is accomplished at the base station 15 by monitoring the RACH channel 25 to determine the percentage of busy RACH sub-channels and comparing this with the total number of available RACH sub-channels. These measurements are then averaged over a period of time to prevent oscillating of the traffic load measurements.

Alternatively, the random access channel load may be based on a measure of the percentage of time the RACH 25 is used. The percentage of used time is obtained by counting all successfully received bursts corresponding to successful access attempts, over all received bursts on the RACH 25 for a given window. A successful access attempt is detected on a received burst when the channel is idle and no CRC error is detected on the received burst. The load measurements are normalized with respect to the total number of burst received during a particular time interval. Measurements of channel load may be done on a continuous or periodic basis depending upon desired system performance.

At inquiry step 75, a determination is made of whether or not the traffic load level is increasing or decreasing. For increasing traffic load levels, the present traffic load on the RACH 25 is compared at inquiry step 80 to the increasing traffic load threshold levels to determine whether one of the thresholds has been reached. If not, control passes back to step 70 to continue monitoring traffic load levels. If a selected threshold level has been reached, the R_DATA LENGTH parameter is set to the value associated with that particular threshold level at step 85, messages are transmitted according to the new parameter at step 90 and control passes back to step 70. The new R_DATA LENGTH is set by transmitting the new value from the base station 15 to the mobile station 20 over the BCCH 22.

If traffic load levels are decreasing, inquiry step 95 determines if one of the decreasing traffic load threshold levels have been reached. When a threshold level is reached, the R_DATA LENGTH parameter is set at step 85 to the value associated with that threshold level, messages are transmitted according to the new parameter at step 90 and control passes back to step 70. Otherwise, control merely passes back to step 70 until a threshold level is achieved.

In this manner, a system provider can control the length of R_DATA messages being transmitted over the RACH 25. During high load periods, the length of R_DATA messages may be decreased such that the more profitable voice, data and fax transmissions may utilize a larger part of system resources. During lower load situations, the R_DATA message length may be increased since additional system resources are not needed for voice, data and fax transmissions.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for dynamically controlling a length of all messages transmitted on a channel of a mobile radio air interface, comprising the steps of:

associating a predetermined threshold value for a traffic load on the air interface with a selected length of the messages;

monitoring the traffic load over the channel of the air interface;

setting a length of the messages equal to the selected length when the traffic load meets the threshold value; and transmitting all the messages on the channel at the selected length.

2. The method of claim 1 wherein the step of associating further comprises associating a predetermined threshold value for the traffic load with a selected value for a R_DATA LENGTH parameter.

3. The method of claim 1 wherein the step of associating further comprises the steps of:

associating a first predetermined threshold value for increasing traffic load with a first selected length of the messages; and associating a second predetermined threshold value for decreasing traffic load with a second selected length of the messages.

4. The method of claim 3 wherein the first and the second preselected threshold values are separated by a predetermined value.

5. The method of claim 1 wherein the step of monitoring further comprises the step of monitoring the traffic load on a random access channel.

6. The method of claim 1 wherein the messages comprise an R_DATA messages.

7. The step of claim 1 wherein the step of monitoring further comprises:

determining if the traffic load is increasing or decreasing;

monitoring a first set of threshold values if the traffic load is increasing; and monitoring a second set of threshold values if the traffic load is decreasing.

8. A method for dynamically controlling a length of R_DATA messages on a random access channel, comprising the steps of:

associating a plurality of predetermined threshold values for a traffic load with a corresponding plurality of selected values for a R_DATA LENGTH parameter;

monitoring a traffic load on the random access channel to determine a presently met threshold value;

setting the R_DATA LENGTH parameter equal to a selected value for the R_DATA LENGTH parameter corresponding to the presently met predetermined threshold level; and transmitting the R_DATA messages on the random access channel according to the set R_DATA LENGTH parameter.

9. The method of claim 8 wherein the step of associating further comprises the steps of:

associating a first predetermined threshold value for increasing traffic load with a first selected value for the R_DATA LENGTH parameter; and associating a second predetermined threshold value for decreasing traffic load with a second selected value for the R_DATA LENGTH parameter.

10. The method of claim 9 wherein the first and the second preselected threshold values are separated by a predetermined value.

11. The method of claim 8 wherein the step of monitoring further comprises:

determining if the traffic load is increasing or decreasing;

monitoring a first set of threshold values if the traffic load is increasing; and monitoring a second set of threshold values if the traffic load is decreasing.

12. The method of claim 8 wherein the step of establishing further comprises the steps of:

establishing a first set of threshold values for increasing traffic load; and establishing a second set of threshold values for decreasing traffic loads.

13. A method for dynamically controlling a length of an R_DATA message on a random access channel:

associating a first set of threshold values for increasing traffic loads with a first set of selected values for a R_DATA LENGTH parameter;

associating a second set of threshold values for decreasing traffic loads with a second set of selected values for a R_DATA length parameter;

determining if the traffic load is increasing or decreasing;

monitoring the traffic load on the RACH for the first set of threshold values if the traffic load is increasing;

monitoring the traffic load on the random access channel (RACH) for the second set of threshold values if the traffic load is decreasing;

setting a R_DATA LENGTH parameter equal to the associated selected value for the R_DATA LENGTH parameter when the traffic load corresponds to one of the first and second threshold levels; and transmitting R_DATA messages on the random access channel according to the set value for the R_DATA LENGTH parameter.

14. The method of claim 13 wherein the first and the second preselected threshold values are separated by a predetermined value.

* * * * *

UNITED STATES PATENT AND TRADEMARK OFFICE
CERTIFICATE OF CORRECTION

PATENT NO : 5,991,633
DATED : November 23, 1999
INVENTOR(S): Michel Corriveau et al.

It is certified that error appears in the above-identified patent and that said Letters Patent are hereby corrected as shown below:

Title page,

[73] Assignee        after "Ericsson" insert --(publ)--

[54] Title        Replace "OF A R_DATA" With --OF R_DATA--

Signed and Sealed this

Tenth Day of April, 2001

Attest:

NICHOLAS P. GODICI

Attesting Officer    Acting Director of the United States Patent and Trademark Office